Figure 4:
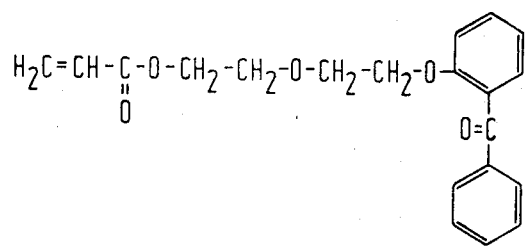

United States Patent [19]

Broer et al.

[11] Patent Number: 4,610,746

[45] Date of Patent: Sep. 9, 1986

[54] METHOD OF OPTICALLY CONNECTING A LIGHT CONDUCTOR TO AN ELECTRO-OPTICAL DEVICE

[75] Inventors: Dirk J. Broer; Johan C. J. Finck, both of Eindhoven, Netherlands

[73] Assignee: U.S. Philips Corporation, New York, N.Y.

[21] Appl. No.: 565,563

[22] Filed: Dec. 27, 1983

[30] Foreign Application Priority Data

Sep. 22, 1983 [NL] Netherlands ............ 8303251

[51] Int. Cl.$^4$ ............................. B32B 31/00
[52] U.S. Cl. ................... 156/275.5; 156/64; 156/275.7; 156/307.3; 156/331.1; 350/96.15; 350/96.17; 350/96.2; 522/96; 522/97
[58] Field of Search ............ 156/64, 331.1, 275.5, 156/307.3, 275.7; 350/96.15, 96.17, 96.2; 204/159.15, 159.19; 522/96, 97

[56] References Cited

U.S. PATENT DOCUMENTS

| | | | |
|---|---|---|---|
| 3,891,523 | 6/1975 | Hismatsu et al. | 204/159.15 |
| 4,133,723 | 1/1979 | Howard | 204/159.15 |
| 4,192,762 | 3/1980 | Osborn | 204/159.19 |
| 4,436,366 | 3/1984 | Abramson | 350/96.2 |
| 4,479,698 | 10/1984 | Landis et al. | 350/96.2 |

FOREIGN PATENT DOCUMENTS 2047913 12/1980 United Kingdom ............ 156/275.5

Primary Examiner—John J. Gallagher
Attorney, Agent, or Firm—Norman N. Spain

[57] ABSTRACT

In the optical connection of telecommuniation glass fibres to semiconductors a curable composition is used which comprises a polyester urethane acrylate or a polyether urethane acrylate. The composition furthermore comprises a heat- or light-activatable initiator.

The refractive index of the cured connecting material is adjusted by the addition of both a reactive diluent which increases the refractive index and a reactive diluent which decreases the refractive index. Said reactive diluents furthermore serve to establish the desired mechanical properties of the connecting material prior to and after curing.

The curable composition is provided on the glass fibres and/or on the semiconductor laser, after which they are contacted with each other and are optically aligned. The composition is then cured by raising the temperature or by exposure to light.

14 Claims, 10 Drawing Figures

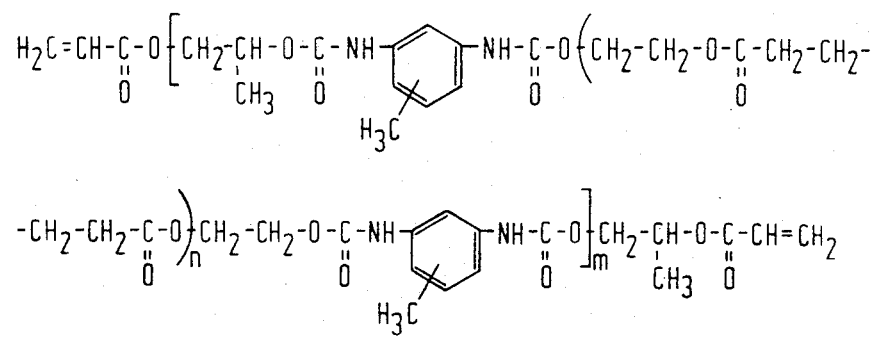
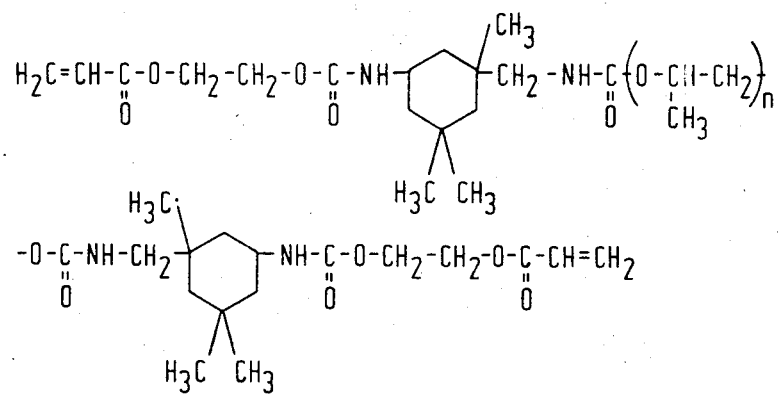
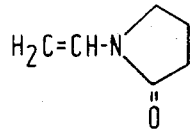
FIG.1
FIG.2
FIG.3

METHOD OF OPTICALLY CONNECTING A LIGHT CONDUCTOR TO AN ELECTRO-OPTICAL DEVICE

The invention relates to a method of optically connecting a light conductor to an electro-optical device by means of a curable composition. The invention may be used, for example, in optically connecting telecommunication glass fibres to semiconductor lasers.

Such a method is described, for example, in Netherlands patent application No. 8002040, according to which method a curable composition is provided on the parts to be connected, after which the light conductor and the electro-optical device are aligned optically and the curable composition is then cured under the influence of actinic light. An important advantage of this method is the absence of solvents so that upon curing no material need evaporate from the connection. The curable composition comprises at least one oligomer, preferably selected from the group of oligomeric urethanes. The curable composition furthermore comprises an actinic-light activatable initiator and diluting monomer which serves to give the curable monomer composition a suitable viscosity between 1 and 20 Pa.s. After curing, the connecting material has a modulus of elasticity between 10 and 300 MPa.

In order to restrict coupling-out of the light and hence loss of light modes in the optical connection as much as possible, it is desired for the connecting material to have a refractive index after curing which approaches the refractive index of the light conductor as much as possible. The desired refractive index is usually between 1.48 and 1.50 for connecting optical glass fibres to semiconductor lasers. The refractive index may be adjusted by adjusting the quantity of diluting monomer, but the scope is restricted by the requirements which are imposed on the viscosity of the monomer composition prior to curing and upon the modulus of elasticity of the connecting material after curing.

It is the object of the invention to provide a method of optically connecting a light conductor to an electro-optical device in which a curable connecting material is used, the composition of which can be adjusting in such a manner that the refractive index after curing is within 0.05% from the desired value, the desired mechanical properties being maintained.

According to the invention this object is achieved by means of a method in which the curable composition comprises from 40 to 95% by weight of at least one oligomer selected from the group of oligomeric acrylates. This composition furthermore comprises from 0.5 to 5% by weight of an initiator which can be activated by heat or by light. Further, according to the invention the refractive index of the connecting material which is achieved after curing is adjusted by the addition of from 2 to 30% by weight of a reactive diluent which has an increasing influence on the refractive index and from 2 to 30% by weight of a reactive diluent which has a decreasing influence on the refractive index. The curable composition after being contacted with the light conductor and the electro-optical device and after mutual positioning of the light conductor and the electro-optical device is cured by means of heat or by exposure to light.

Particularly suitable oligomers for use in the method according to the invention are oligomers from the group formed by polyester urethane acrylates and polyether urethane acrylates.

The invention is based on the recognition of the fact that the refractive index can be accurately adjusted by adding to the curable monomer composition both a reactive diluent increasing the refractive index and a reactive diluent decreasing the refractive index, while the total quantity of reactive diluent can be chosen freely. As a result the advantage that is achieved by adjusting the total quantity of the reactive diluents the viscosity can be adjusted prior to curing and the modulus of elasticity of the connecting material can be adjusted after curing. The mutual ratio of the reactive diluents establishes the refractive index. The reactive diluents are polymerized in situ upon curing so that upon curing no material need be removed from the connection, for example by evaporation.

Suitable reactive diluents having a refractive index-increasing influence are N-vinyl-2-pyrrolidone, 2'-oxybenzophenone-2-ethoxy-ethyl acrylate and 2-phenoxy-ethyl acrylate. Suitable reactive diluents having a refractive index-decreasing influence are 2-ethoxy-ethyl acrylate and 2'-ethoxy-2-ethoxy-ethyl acrylate.

Suitable heat-activatable initiators are organic peroxides and azobisisobutyronitrile, which can be activated by a rise in temperature to between 50° and 100° C.

A suitable light-activatable initiator is $\alpha,\alpha$-dimethoxy-$\alpha$-phenyl-acetophenone which can be activated by exposure to UV light.

The refractive index of the connecting material formed by curing of the curable composition can be simply computed from the composition of the connecting material because the contribution of each component to the refractive index is proportional to the volume fraction thereof in the mixture, within the range of compositions of the connecting material according to the invention. By measuring the refractive indices of connecting materials formed from only a few different compositions, the contributions of the oligomer and of the reactive diluents to the refractive index can be established. The refractive index that is reached after curing the curable composition has to be measured because the refractive index is influenced by polymerization shrinkage which occurs in the reactive diluents. The composition which is necessary to obtain a desired refractive index can now be determined by simple linear interpolation.

Figure 5:
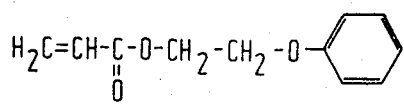
Figure 6:
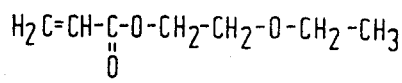
Figure 7:
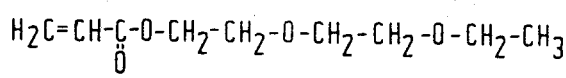
Figure 8:
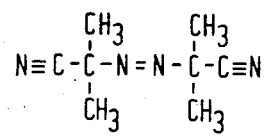
Figure 9:
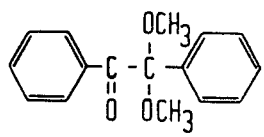

The accompanying formula sheet shows the structural formulae of a few compounds used according to the invention:

FIG. 1 shows that of a polyester urethane acrylate,
FIG. 2 shows that of a polyether urethane acrylate,
FIG. 3 shows that of N-vinyl-2-pyrrolidone,
FIG. 4 shows that of 2'-oxybenzophenone-2-ethoxy-ethyl acrylate,
FIG. 5 shows that of 2-phenoxy-ethyl acrylate,
FIG. 6 shows that of 2-ethoxy-ethyl acrylate,
FIG. 7 shows that of 2'-ethoxy-2-ethoxy-ethyl acrylate,
FIG. 8 shows that of azobisisobutyronitrile, and
FIG. 9 shows that of $\alpha,\alpha$-dimethoxy-$\alpha$-phenyl-acetophenone.

Figure 10:
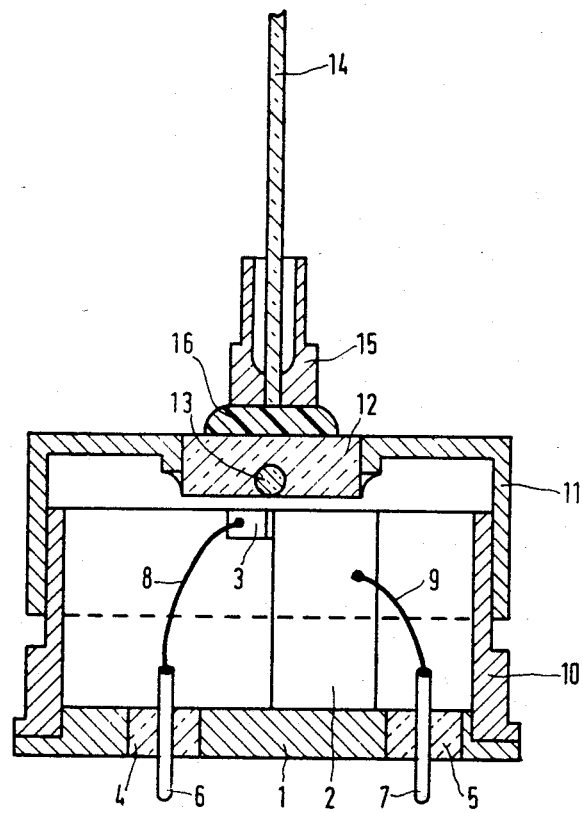

Further, FIG. 10 shows a diagrammatic cross-section of an embodiment of the invention in which a glass fibre that is optically connected to a light source by means of a connecting material according to the invention.

FIG. 10 shows a metallic supporting member 1 with a copper block 2 which functions as a heat sink. A semiconductor laser 3 is mounted on the block 2. The support 1 comprises two glass feedthroughs 4 and 5, in which connecting pins 6 and 7 are arranged, which are connected to the semiconductor laser 3 and to the copper block 2 via leads 8 and 9, respectively. In addition, the assembly comprises a container 10 and a cap 11. A glass plate 12 is fastened in the cap 11, for example by means of glue. The glass plate 12 contains a spherical lens 13. The lens 13 is aligned so that the centre of the lens coincides with the main axis of the light beam emerging from the semiconductor laser 3. A glass fibre 14, which is held in a clamp 15, is optically connected to the semiconductor laser 3 by means of a connecting material 16 which is placed between the glass fiber 14 and the glass plate 12.

The invention will now be described in greater detail with reference to a number of examples, in which the glass fibres have a refractive index between 1.48 and 1.50.

EXAMPLE 1

A curable composition is prepared with 59.5% by weight of a polyester urethane acrylate of the formula as shown in FIG. 1 in which m is on an average 2.6 and n is on an average 8, this compound after curing without a reactive diluent having a refractive index $n_D=1.4935$. The monomer composition furthermore comprises 20% by weight of N-vinyl-2-pyrrolidone, 20% by weight of 2-ethoxy-ethyl acrylate and 0.5% by weight of azobis-isobutyronitrile. The monomer composition is provided between an optical glass fibre and a semiconductor laser which are optically aligned. The whole construction is then kept at a temperature of 70° C. for 1 hour is a nitrogen atmosphere to cure the curable composition. After curing, the connecting material has a refractive index $n_D=1.5014$.

EXAMPLE 2

As in Example 1, but in which 69.5% by weight of the polyester urethane acrylate is used, with 5% by weight of N-vinyl-2-pyrrolidone, 25% by weight of 2-ethoxy-ethyl acrylate and 0.5% by weight of azobis-isobutyronitrile. After curing for 1 hour at 70° C. the resultant connecting material has a refractive index $n_D=1.4904$.

EXAMPLE 3

As in Example 1, but in which 68.6% by weight of the polyester urethane acrylate is used in the curable composition, with 14.7% by weight of N-vinyl-2-pyrrolidone, 14.7% by weight of 2'-ethoxy-2-ethoxy-ethyl acrylate and 2.0% by weight of α,α-dimethoxy-α-phenyl acetophenone. The composition is cured by exposure to UV light of 200 to 400 nm for 5 seconds. After curing, the resultant connecting material has a refractive index $n_D=1.4994$.

EXAMPLE 4

A curable composition is prepared with 68.6% by weight of a polyether urethane acrylate of the formula as shown in FIG. 2, in which n is on an average 75. This compound upon curing without a reactive diluent has a relatively low refractive index, $n_D=1.4682$, so that a slightly larger quantity of a refractive index-increasing reactive diluent may be necessary. Particularly suitable therefor are 2'-oxybenzophenone-ethoxy-ethyl acrylate and 2-phenoxy-ethyl acrylate. According to this example 24.5% by weight of 2'-oxybenzophenone-2-ethoxy-ethyl acrylate is used with 4.9% by weight of 2-ethoxy-ethylacrylate and 2.0% by weight of α,α-dimethoxy-α-phenyl acetophenone. The composition is cured by exposure to a medium pressure mercury-vapour lamp for 0.12 seconds. After curing, the refractive index of the resulting connecting material is 1.4915.

EXAMPLE 5

As in Example 4, in which 78.4% by weight of the polyether urethane acrylate is used, with 14.7% by weight of 2'-oxybenzophenone-2-ethoxy-ethyl acrylate, 4.9% by weight of 2-ethoxy-ethyl acrylate and 2.0% by weight of α,α-dimethoxy-α-phenyl-acetophenone. The refractive index after curing by radiation is 1.4821.

All refractive indices were measured at 25° C. The connecting materials described in the examples after curing have a modulus of elasticity of approximately 5 MPa. The glass transition temperature is below −30° C. so that the cured connecting material is rubber-like at the operating temperature. Flow of the cured connecting material does not occur at temperatures up to 100° C. The number of transmitted light modes is at least 5. The connecting material is readily transparent at wavelengths between 800 and 900 nm, as is desired for telecommunication applications. The bonding of the connecting material to quartz, to glass and to the semiconductor laser is good. The yield of good optical connections after an accelerated lift test increased by 20% by using the method according to the invention.

What is claimed is:

1. A method of optically connecting a light conductor to an electro-optical device by means of a curable composition, characterized in that the curable composition comprises from 40 to 95% by weight of at least one oligomer selected from the group of oligomeric acrylates, which composition furthermore comprises from 0.5 to 5% by weight of a heat- or light-activatable initiator, the refractive index of the connecting material which is reached after curing being adjusted by the addition of from 2 to 30% by weight of a reactive diluent which has a refractive index-increasing influence and from 2 to 30% by weight of a reactive diluent which has a refractive index-decreasing influence, said curable composition being contacted with the light conductor and the electro-optical device and after mutual positioning of the light conductor and the electro-optical device being cured by means of a rise in the temperature or by exposure to light.

2. A method as claimed in claim 1, characterized in that the oligomer is selected from the group formed by polyester urethane acrylates and polyether urethane acrylates.

3. A method as claimed in claim 1, characterized in that the reactive diluent having a refractive index-increasing influence is selected from the group formed by N-vinyl-2-pyrrolidone, 2'-oxybenzophenone-2-ethoxy-ethyl acrylate and 2-phenoxy-ethyl acrylate.

4. A method as claimed in claim 1, characterized in that the reactive diluent having a refractive index-decreasing influence is 2-ethoxy-ethyl acrylate or 2'-ethoxy-2-ethoxy-ethyl acrylate.

5. A method as claimed in claim 1, characterized in that the initiator is azobisisobutyronitrile and that curing is carried out by a rise in the temperature.

6. A method as claimed in claim 1, characterized in that the initiator is α,α-dimethoxy-α-phenyl acetophenone and curing is carried out by exposure to UV light.

7. A method as claimed in claim 1, characterized in that the oligomer is a polyester urethane acrylate of the formula

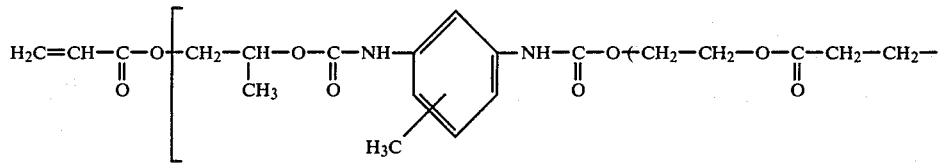
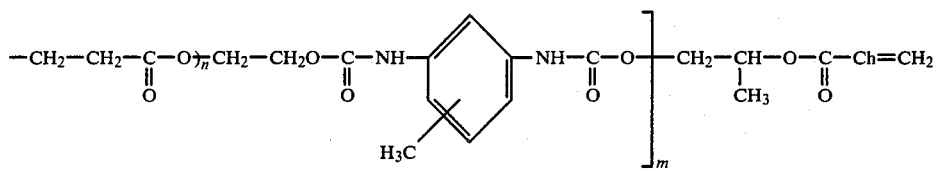

in which m is on an average 2.6 and n is on an average 8.

8. A method as claimed in claim 1, characterized in that the oligomer is a polyether urethane acrylate of the formula

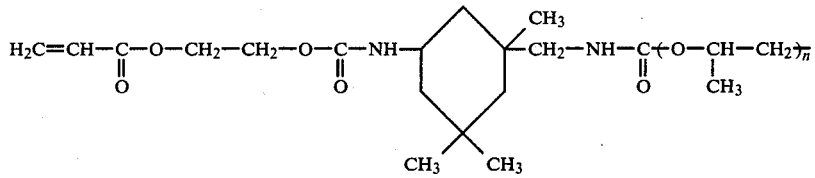
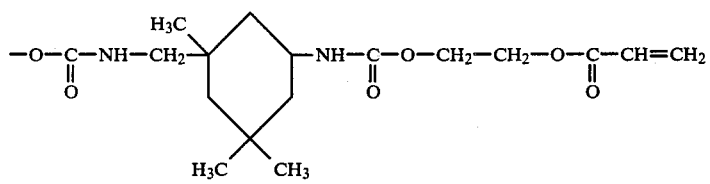

in which n is on an average 75 and in which the reactive diluent having a refractive index-increasing influence is selected from the group formed by 2'-oxygenzophenone-2-ethoxyethyl acrylate and 2-phenoxy-ethyl acrylate.

9. A method as claimed in claim 2, characterized in that the reactive diluent having a refractive index-increasing influence is selected from the group formed by N-vinyl-2-pyrrolidone, 2'-oxybenzophenone-2-ethoxy-ethyl acrylate and 2-phenxy-ethyl acrylate.

10. A method as claimed in claim 2, characterized in that the reactive diluent having a refractive index-decreasing influence is 2-ethoxy-ethyl acrylate or 2'-ethoxy-2-ethoxy-ethyl acrylate.

11. A method as claimed in claim 2, characterized in that the initiator is azobisisobutyronitrile and that curing is carried out by a rise in the temperature.

12. A method as claimed in claim 3, characterized in that the initiator is azobisisobutyronitrile and that curing is carried out by a rise in the temperature.

13. A method as claimed in claim 2, characterized in that the initiator is α,α-dimethyl-α-phenyl-acetophenone and curing is carried out by exposure to UV light.

14. A method as claimed in claim 2, characterized in that the oligomer is a polyether urethane acrylate of the formula

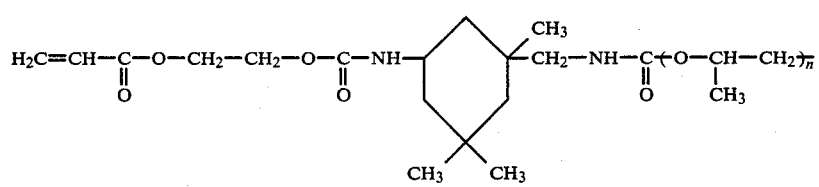

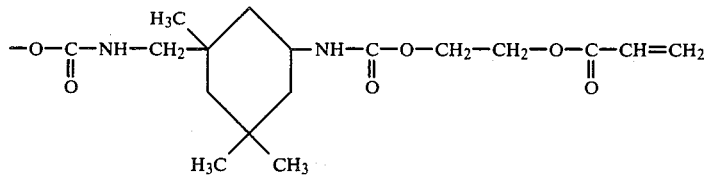
in which n is on an average 75 and in which the reactive diluent having a refractive index-increasing influence is selected from the group formed by 2′-oxygenzophenone-2-ethoxyethyl acrylate and 2-phenoxy-ethyl acrylate.
* * * * *